C. N. ALLEN.
TIRE CLEANING BRUSH.
APPLICATION FILED JAN. 24, 1917.
1,272,352.
Patented July 16, 1918.
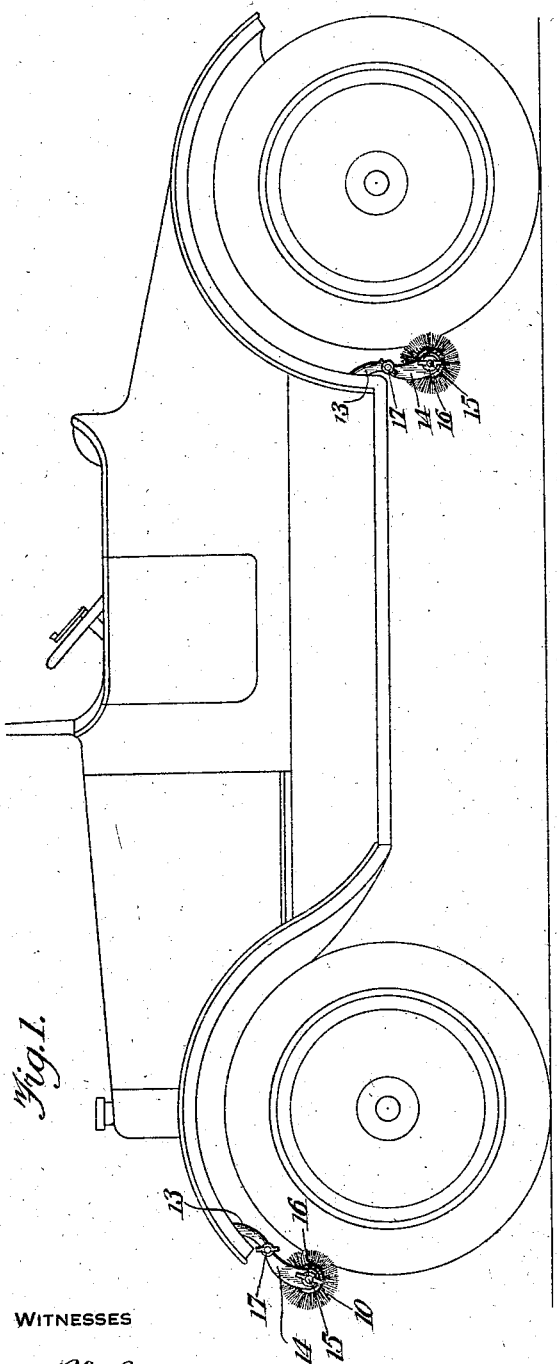
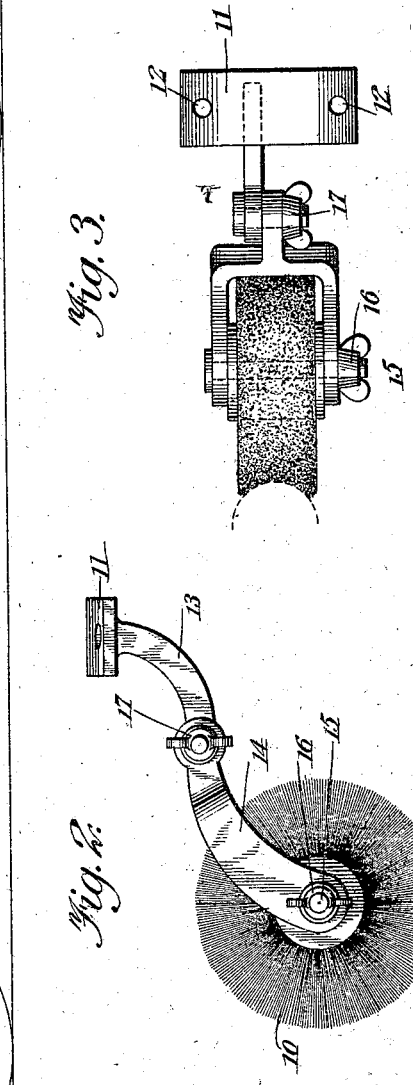
WITNESSES
INVENTOR
C. N. Allen,
BY Victor J. Evans
ATTORNEY

UNITED STATES PATENT OFFICE.

CLAUDE N. ALLEN, OF MICHIGAN CITY, INDIANA, ASSIGNOR TO A. T. S. D. MANUFACTURING COMPANY, OF MICHIGAN CITY, INDIANA.

TIRE-CLEANING BRUSH.

1,272,352. Specification of Letters Patent. Patented July 16, 1918.

Application filed January 24, 1917. Serial No. 144,240.

*To all whom it may concern:*

Be it known that I, CLAUDE N. ALLEN, a citizen of the United States, residing at Michigan City, in the county of Laporte and State of Indiana, have invented new and useful Improvements in Tire-Cleaning Brushes, of which the following is a specification.

This invention comprehends the provision of means for removing from the tires of bicycles, motorcycles, and automobile wheels, the small particles of glass, gravel and other foreign matter that embeds itself in the tread of the tire, and eventually works its way into the fabric of the tire with a result that the latter is soon destroyed.

More specifically stated the invention embodies a cleaning element in the nature of a brush that can be readily and easily attached to an appropriate part of the vehicle, and in juxtaposition to the tire so that the latter is relieved of the particles of glass and gravel before they have a chance to work their way into the tread any appreciable extent with a detrimental effect upon the tire.

In carrying out the invention I provide means whereby the brush can be adjusted relative to the tire without detaching the article from the vehicle, with a view of arranging the brush closer to the tire as the brush becomes worn at some particular place, or with a view of presenting an entirely new surface to the tire for use.

The invention further embodies the desired features of simplicity in construction, and is capable of application to any vehicle without necessitating any alteration of the latter.

The nature and advantages of the invention will be better understood from the following detail description when taken in connection with the accompanying drawing, the invention residing in the construction, combination and arrangement of parts as claimed.

In the drawing forming part of this specification like numerals of reference indicate similar parts in the several views and wherein:—

Figure 1 is a fragmentary side elevation of a motor vehicle showing the device forming the subject matter of the invention applied thereto in position for use.

Fig. 2 is an enlarged detail side elevation of the device removed from the machine.

Fig. 3 is an enlarged edge elevation.

Referring to the drawing in detail 10 indicates a brush preferably of circular outline, and adapted to be supported from an appropriate part of the vehicle in a manner whereby the brush will be disposed in juxtaposition to the tires, with a view of cleaning the tire by separating therefrom small particles of glass, gravel and other foreign matter picked up by the tire, and which would otherwise gradually work its way into the fabric of the tire with a destroying effect. While the brushes are herein shown suspended from the mud guards of the machine, it is to be borne in mind that the brushes can extend from the running board, axle, bumper or any other appropriate part of the machine, while it is further understood that a general application of the device to bicycles, motor cycles and the like is contemplated by the claim. The brush is relatively stiff considering the purpose of the same, and is preferably concave in cross section as shown to conform to the curvature of the tire.

Use is made of an attaching plate 11 which may be secured to the machine by suitable fastening elements adapted to pass through the openings 12 in the plate, while extending from the plate 11 is a fixed arm 13. A yoke 14 is pivotally mounted upon the free extremity of the arm 13 while the cleaning element or brush 10 is supported upon a shaft 15 passed through alined openings in the respective limbs of the yoke 14. The shaft 15 has a threaded extremity to accommodate a thumb nut 16 which when tightened upon the shaft effectively holds the brush 10 in a fixed position relative to the yoke. As shown a brush is arranged in juxtaposition to each of the wheels of the vehicle, and is preferably placed at the front of the latter, in which position it is less likely to catch the dirt and mud thrown from the wheels of the vehicle. It will be noted that the arm 13 and yoke 14 are curved longitudinally and reversely disposed, so that these parts provide for a clearance of the mud guard to which the arm 13 is secured, while the curvature of the yoke 14 spaces the latter the proper distance away from the wheel, and yet properly positions the brush with respect to the tire. By reason of the pivotal connection between the arm 13 and the yoke 14, it is manifest that the yoke can be adjusted to change the position of the brush with respect to the tire. In other words should the brush become worn at some particular place, the yoke 14 could be adjusted in a direction to bring the brush closer to the tire to compensate for the wear, as will be readily understood, and by tightening the thumb screw 17 the yoke and brush could be held fixed in this adjusted position. In addition to providing for this adjustment, the brush can be rotated on the axle shaft 15 to present a new wearing surface for the tire as the occasion may require, and subsequent to this adjustment a tightening of the set screw 16 will hold the brush fixed relative to the yoke. Again, should it be desired to remove the brush from the yoke, for the purpose of washing or repairing the brush, this can readily be accomplished by removing the set screw 16 from the shaft, after which the brush can be readily removed from the yoke. The device in its entirety is very simple in construction, and practical for the purpose intended.

While it is believed that from the foregoing description the nature and advantages of the invention will be readily apparent, I desire to have it understood that I do not limit myself to what is herein shown and described, as the same is merely illustrative of the preferred embodiment of the invention, and it is therefore not to be considered restrictive. Changes may be resorted to when desired as fall within the scope of what is claimed.

What is claimed is:—

A tire cleaning device for motor vehicle, comprising an elongated plate adapted to be secured at an appropriate part of the machine, an arm projecting from said plate, a yoke pivotally associated with the extremity of said arm, a shaft carried by the yoke and having a threaded extremity, an annular brush capable of rotation mounted on said shaft, a nut associated with the threaded extremity of said shaft for holding said brush fixed relative to the yoke, and a thumb screw at the pivotal connection of said yoke and the projected arm for holding the said brush in adjusted positions.

In testimony whereof I affix my signature.

CLAUDE N. ALLEN.

Copies of this patent may be obtained for five cents each, by addressing the "Commissioner of Patents, Washington, D. C."